United States Patent [19]

Villa et al.

[11] Patent Number: 4,561,986

[45] Date of Patent: Dec. 31, 1985

[54] COMBINED DISPERSANT FLUID LOSS CONTROL ADDITIVES

[76] Inventors: José L. Villa, 50 Claire Dr., Bridgewater, N.J. 08807; Ronald N. Zeiner, 30 James St., Dover, N.J. 07801

[21] Appl. No.: 632,284

[22] Filed: Jul. 19, 1984

[51] Int. Cl.$^4$ .............................................. C09K 7/02
[52] U.S. Cl. ............................. 252/8.5 A; 252/8.5 C
[58] Field of Search ......................... 252/8.5 C, 8.5 A

[56] References Cited

U.S. PATENT DOCUMENTS

| | | | |
|---|---|---|---|
| 2,552,775 | 5/1951 | Fischer et al. | 252/8.5 |
| 2,718,497 | 9/1955 | Oldham et al. | 252/8.5 |
| 3,334,072 | 8/1967 | Sellet . | |
| 3,764,530 | 10/1973 | Burland et al. | 252/8.5 |
| 4,476,029 | 10/1984 | Sy et al. | 252/8.5 |

OTHER PUBLICATIONS

CA77:165531b (1972).
CA87:25579e (1977).
Encyclopedia of Chemical Technology, Third Edition, vol. 17 (Kirk–Othmer), pp. 154–157.

*Primary Examiner*—Herbert B. Guynn

[57] ABSTRACT

Water soluble polymer compositions containing polyacrylic acid and copolymer of itaconic acid and acrylamide are useful as combined dispersant and fluid loss control additives for aqueous drilling fluids, particularly fresh water, gypsum and seawater muds. An example is a polymer composition containing about 80% by weight polyacrylic acid and about 20% by weight copolymer of itaconic acid and acrylamide in its ammonium salt form.

12 Claims, No Drawings

COMBINED DISPERSANT FLUID LOSS CONTROL ADDITIVES

BACKGROUND OF THE INVENTION

1. Field of the Invention

This invention relates to particular water-soluble polymer compositions containing polyacrylic acid and copolymer of itaconic acid and acrylamide and their use as combined dispersant and fluid loss control additives for aqueous drilling fluids which are used in drilling wells in subterranean formations.

2. Description of the Prior Art

Rotary systems are generally used in drilling oil and gas wells. These systems depend upon rotation of a string of drill pipe to the bottom of which is attached a drill bit. The bit cuts into the formation causing the cuttings to accumulate as drilling continues. A drilling fluid is used which lubricates the drill bit and carries cuttings to the surface for removal. This allows the bit to continue functioning and the bottom hole to be clean and free of cuttings. The drilling fluid is also the source of pressure which is exerted against the formation. Even in other drilling systems, drilling fluids are still needed to remove bore hole cuttings and to otherwise perform functions related to drilling fluids.

Control of rheology of the drilling fluids, i.e., plastic viscosity, yield point and gel strength is needed to assure effective pumping of the drilling fluid. Usually this means reducing yield point and gel strength of the drilling fluid. One means for control is the addition of thinners (dispersants) to the drilling fluid. These materials are generally anionic in charge and are attracted to the electrically charged clay particles. Through neutralization of the charge on the clay particles by the thinners or dispersants, the rheology of the drilling fluid can be controlled for a more efficient drilling of the well. Examples of thinners or dispersants are lignites and lignosulfonates such as chrome lignosulfonate and ferrochrome lignosulfonate. However, the chrome and ferrochrome lignosulfonates have the disadvantage of containing heavy metals which cause environmental problems and are not as effective in seawater.

The homopolymer of acrylic acid has also been used as a thinner.

Further, oil and gas producing formations are generally porous layers having varying degrees of permeability to the flow of fluids such as oil, water or gas. When drilling through such porous formations, it is essential to employ drilling fluids having characteristics such that excessive amounts of the drilling fluid do not penetrate the porous formation. Drilling fluids have a tendency to penetrate the formation because pressure in the bore hole is greater than the pressure opposing it which comes from the formation. Should excess penetration occur, there is loss of drilling fluid into the formation resulting in loss of pressure, inability to drill and remove cuttings and in the case of loss from brine muds, extra expense because of their cost.

SUMMARY OF THE INVENTION

Particular water soluble polymer compositions which contain polyacrylic acid and the copolymer of itaconic acid and acrylamide have been found to be outstanding thinners (dispersants) and fluid loss control additives for aqueous drilling fluids. They are effective in fresh water, seawater and calcium containing fresh water muds even under elevated temperatures of 400° F. These compositions are added to water based drilling fluids, which are then used in the conventional manner.

DESCRIPTION OF THE PREFERRED EMBODIMENTS

The compositions are water soluble polymers of (1) from about 75% to about 85% by weight of acrylic acid having a weight average molecular weight of between about 3,500 to about 4,500 and (2) from about 15% to about 25% by weight of a copolymer of itaconic acid and acrylamide having a weight average molecular weight of between about 20,000 to about 40,000, there being from about 40% to about 50% by weight of itaconic acid and from about 50% to about 60% by weight of acrylamide in said copolymer. These compositions can be in their partially or completely neutralized sodium, potassium or ammonium salt form. They have a weight average molecular weight of between about 5,000 to about 15,000, preferably between about 8,000 to about 12,000.

These compositions are present in the various drilling fluids including fresh water, seawater and calcium containing fresh water muds in amounts sufficient to control the rheology of the mud and to reduce fluid loss of the drilling fluid, for example, in amounts of from about 0.25 to about 11 pounds, preferably from about 1 to about 6 pounds per 42 gallon barrel of drilling fluid.

The compositions can be prepared by conventional polymerization procedures, viz., solution or emulsion polymerization in the presence of conventional free radical initiators. For example, copolymerization of itaconic acid and acrylamide can be carried out in the presence of polyacrylic acid. Alternatively, acrylic acid is polymerized and acrylamide and itaconic acid copolymerized separately and the resulting polymers mixed together. These polymerizations are well documented in the literature and do not form a part of this invention.

Evaluation of Copolymers as Fluid Loss Additives

The following procedures were utilized to evaluate the polymer compositions as additives in the various drilling muds.

Preparation of Test Samples (Polymer Plus Mud)

350 ml of mud is placed in a stainless steel beaker. The required amount of polymer is weighed in a weighing dish (1 gm. polymer in 350 ml mud equals 1 pound per barrel). With thorough mixing, the polymer is added slowly to the mud and mixed for an additional 15–20 minutes. The pH of the mud is monitored during mixing and adjusted to pH 10–11 if necessary. After the mixing period, viscosities and gel strength of the mud can be measured if desired using a Fann viscometer (Model 35-A). Fluid loss measurements are then run on the samples.

API Fluid Loss Test

Equipment:
IMCO Standard Filter Press #R1100 (supplied by Imco Services Division of Halliburton Company.)
Nitrogen gas cylinder for pressurizing the fluid loss cell.

Test Conditions:
77° F., 100 psi pressure. Collect filtrate for 30 minutes.

Procedure:

1. The mud sample is placed in the cell of the filter press, cell filled to within ¼" of the top.
2. The cell is placed in the filter press frame.
3. 100 psi pressure (using nitrogen gas) is applied to the filter cell and timing of the test is started.
4. At the end of 30 minutes, the volume of filtrate collected is read. The lower the volume of filtrate collected, the more effective is the polymer in preventing loss of fluid from the mud formulation.

High Temperature High Pressure Fluid Loss Test

This test method is described in Baroid Drilling Mud Data Book, Section 900, pp. 26-27 entitled, "High Temperature Filtration Testing for Drilling Fluids." The following summarizes the equipment, conditions and procedure.

Equipment:
HPHT Filter Press, Model #387 (supplied by NL Baroid, Houston, Tex.), which includes cell and heating jacket.

Test Conditions:
Temperature can be varied from 200°-400° F. Pressure is normally set at 500 psi differential (600 psi at top, 100 psi back pressure at bottom).

Procedure:
(a) The mud sample is placed into the fluid loss cell.
(b) The cell is placed into the heating jacket.
(c) Top and bottom pressure lines are connected.
(d) After ensuring that the stems on the fluid loss cell are shut, 250 psi top and 100 psi bottom pressure is applied using nitrogen gas.
(e) The cell is heated to the required temperature (in about one hour's time) and equilibrated at the temperature for an additional half hour.
(f) The bottom stem is opened, then the top stem and any collected fluid is bled out.
(g) Top pressure is set to 600 psi.
(h) Time is recorded and fluid loss readings are taken at intervals of 1, 3, 7½ and 30 minutes.
(i) Total volume of filtrate collected after 30 minutes is recorded and multiplied by two (correction for 3.5 sq. inch filtration area versus 7 sq. inch area).

Heat Aging Test

Equipment:
Aging cell, Model #76017 obtained from NL Baroid, Houston, Tex. Roller or forced air oven.

Procedure:
(a) Mud containing polymer is placed in aging cell.
(b) The contents of the cell are pressurized with nitrogen gas using the recommended pressures provided in FIG. 29, page 900-32 of "Mud Volume and Pressure for High Temperature Aging", NL Baroid, Drilling Mud Data Book, Section 900.
(c) The cell is then placed in a roller oven pre-heated to the desired heat aging temperature (dynamic or hot rolled heat aging) or a forced air oven (static heat aging) for 16 hours. All testing is dynamic heat aging unless indicated otherwise.
(d) At the end of the heat aging period, the aging cell is removed from the oven, cooled under cold running water, pressure released and the aged mud transferred into a stainless steel beaker.
(e) The pH of the mud is checked and if necessary adjusted to between 8.5 to 11. Rheology measurements are run using Fann viscometer, Model 35-A followed by the fluid loss test which is either the API or high temperature high pressure fluid loss test described previously.

Mud Rheology

Plastic viscosity (PV), yield point (YP) and gel strengths at 10 second and 10 minute intervals were obtained as described in API RP 13B, 9th Edition, pages 5 and 6.

Molecular Weights

Molecular weights were determined by gel permeation chromatography using sodium polystyrene sulfonate as the standard and reported as weight average molecular weight.

For a fuller understanding of the nature and advantages of this invention, reference may be made to the following examples. These examples are given merely to illustrate the invention and are not to be construed in a limiting sense.

In the examples all references to pounds per barrel of drilling fluid are to a 42 gallon barrel of the drilling fluid, bbl is barrel and ppb is parts per barrel.

EXAMPLE I

The following additive was evaluated for its combined dispersing and fluid loss control properties in fresh water, gypsum and seawatermuds. It is a 30% by weight aqueous solution of the following (on a dry basis):

| Component | Weight Average Molecular Weight | % By Wt. |
|---|---|---|
| polyacrylic acid | 3500-4500 | 79.35 |
| copolymer of itaconic acid (43.1% by wt.) and acrylamide (56.9% by wt.) | 20,000-25,000 | 20.65 | in the form of its completely neutralized ammonium salt, having a weight average molecular weight of 8,000±3,000 and a pH of 8.5. This additive was prepared by copolymerizing itaconic acid and acrylamide in the presence of polyacrylic acid.

The data obtained with the above additive are set forth below in Tables I, II and III A and B.

TABLE I

| | Fresh Water Mud Composition | | |
|---|---|---|---|
| | Fresh water | 0.85 bbl | |
| | Bentonite | 22.5 ppb | |
| | Barite | 250 ppb | |
| | pH adjusted to 10.00 | | |

| | Mud | Mud with 2 ppb additive | After Heat Aging (16 Hrs, 150° F., hot rolled) Mud with 2 ppb additive | After Heat Aging (16 Hrs, 400° F., static) Mud with 2 ppb additive |
|---|---|---|---|---|
| Apparent viscosity (cps) | 78 | 30 | 34 | 42 |
| Plastic viscosity (cps) | 28 | 27 | 30 | 37 |
| Yield point (lbs/100 ft.²) | 100 | 6 | 8 | 9 |
| Gel strength (lbs/100 ft.²) | 100/118 | 1/2 | 3/3 | 2/2 |

TABLE I-continued

Fresh Water Mud Composition

| | |
|---|---|
| Fresh water | 0.85 bbl |
| Bentonite | 22.5 ppb |
| Barite | 250 ppb |
| pH adjusted to 10.00 | |

| | Mud | Mud with 2 ppb additive | After Heat Aging (16 Hrs, 150° F., hot rolled) Mud with 2 ppb additive | After Heat Aging (16 Hrs, 400° F., static) Mud with 2 ppb additive |
|---|---|---|---|---|
| H.T. H.P. fluid loss 300° F. after 30 min. (ml) | >100 | 66 | 56 | 60 |

TABLE II

Gypsum Mud

| | |
|---|---|
| Fresh water | 0.85 bbl |
| Bentonite | 22.5 ppb |
| Barite | 250 ppb |
| Gypsum | 4 ppb |
| pH adjusted to 10.00 | |

| | Mud | Mud with 2 ppb additive | After Heat Aging (16 Hrs, 150° F., hot rolled) Mud with 2 ppb additive | After Heat Aging (16 Hrs, 400° F., static) Mud with 2 ppb additive |
|---|---|---|---|---|
| Apparent viscosity (cps) | 32 | 15 | 18 | 21 |
| Plastic viscosity (cps) | 8 | 12 | 15 | 20 |
| Yield point (lbs/100 ft.$^2$) | 48 | 6 | 5 | 2 |
| Gel strength (lbs/100 ft.$^2$) | 26/29 | 16/33 | 4/16 | 1/2 |
| H.T. H.P. fluid loss 300° F. after 30 min. (ml) | >100 | 84 | 84 | 80 |

TABLE III

Seawater Mud Composition

| | |
|---|---|
| Fresh water | 0.85 bbl |
| Bentonite | 22.5 ppb |
| Barite | 250 ppb |
| Sodium chloride | 12.25 ppb |
| pH adjusted to 10.00 | |

| | | API Fluid Loss Test | | After Heat Aging (16 Hrs. 150° F., hot rolled) | | After Heat Aging (16 Hrs. 400° F., static) | |
|---|---|---|---|---|---|---|---|
| | Mud | Mud with 2 ppb additive | Mud with 5 ppb additive | Mud with 2 ppb additive | Mud with 5 ppb additive | Mud with 2 ppb additive | Mud with 5 ppb additive |
| Apparent viscosity (cps) | 89 | 22 | 23 | 24 | 23 | 31 | 35 |
| Plastic viscosity (cps) | 13 | 8 | 9 | 7 | 8 | 8 | 9 |
| Yield point (lbs/100 ft.$^2$) | 151 | 27 | 27 | 36 | 29 | 46 | 51 |
| Gel strength (lbs/100 ft.$^2$) | 54/56 | 24/29 | 24/32 | 26/29 | 23/27 | 36/39 | 42/47 |
| H.T. H.P. fluid loss 300° F. after 30 min. (ml) | >200 | 102 | 76 | 102 | 103 | 136 | 118 |

EXAMPLE II

In this example, sodium polyacrylate having a weight average molecular weight of 3,500–4,500 and a solids content of 33% by weight and two additives of this invention were evaluated for their combined dispersing and fluid loss control properties in seawater and gypsum muds. One additive of this invention was the additive of Example I. The other additive of this invention was prepared by mixing together polyacrylic acid salt and the salt of the copolymer of acrylamide and itaconic acid. It was a 30% by weight aqueous solution of the following (on a dry basis):

| Component | Weight Average Molecular Weight | % BY Wt. |
|---|---|---|
| polyacrylic acid | 3,500–4,500 | 79.35 |
| copolymer of itaconic acid (43.1% by wt.) and acrylamide (56.9% by wt.) | 30,000–40,000 | 20.65 | and was in the form of its completely neutralized ammonium salt having a weight average molecular weight of 8,500±2,000.

It is identified in the tables as Example II additive.

The data obtained are set forth below in Tables IV and V.

TABLE IV

SEAWATER MUD COMPOSITION

| | | |
|---|---|---|
| Fresh water | 0.85 | bbl |
| Bentonite | 22.50 | ppb |
| Barite | 250.00 | ppb |
| Sodium Chloride | 12.25 | ppb |
| Density | 12.50 | lbs/gal |

| | BASE MUD | | BASE MUD WITH 2 ppb Na Polyacrylate | | BASE MUD WITH 2 ppb Ex. I Additive | | BASE MUD WITH 2.2 ppb Ex. II Additive* | |
|---|---|---|---|---|---|---|---|---|
| | Before Heat Aging | Heat Aged 16 hrs 300° F. | Before Heat Aging | Heat Aged 16 hrs 300° F. | Before Heat Aging | Heat Aged 16 hrs 300° F. | Before Heat Aging | Heat Aged 16 hrs 300° F. |
| pH | 10.5 | 10.5 | 10.2 | 10.4 | 10.1 | 10.0 | 10.0 | 10.0 |
| Apparent Visc. (cps) | 108 | 48 | 23 | 28 | 21 | 31 | 20 | 30 |
| Plastic Visc. (cps) | 14 | 6 | 8 | 9 | 11 | 11 | 9 | 9 |
| Yield Point (lbs/100 ft$^2$) | 189 | 83 | 29 | 38 | 22 | 42 | 21 | 41 |
| Gel Strength (lbs/100 ft$^2$) | 73/74 | 49/53 | 26/29 | 29/34 | 21/29 | 34/39 | 20/28 | 33/35 |
| Fluid Loss, API (ml) | 53 | 50 | 41 | 42 | 36 | 35 | 35 | 38 |

*Dose level of 2.2 ppb adjusted to equal activity of other two additives.

TABLE V

GYPSUM MUD COMPOSITION

| | | |
|---|---|---|
| Fresh Water | 0.85 | bbl |
| Bentonite | 22.50 | ppb |
| Barite | 350.00 | ppb |
| Gypsum | 4.00 | ppb |
| Density | 14 | lbs/gal. |

| | BASE MUD | | BASE MUD WITH 2 ppb Na Polyacrylate | | BASE MUD WITH 2 ppb Ex. I Additive | | BASE MUD WITH 2.2 ppb Ex. II Additive* | |
|---|---|---|---|---|---|---|---|---|
| | Before Heat Aging | Heat Aged 16 hrs 300° F. | Before Heat Aging | Heat Aged 16 hrs 300° F. | Before Heat Aging | Heat Aged 16 hrs 300° F. | Before Heat Aging | Heat Aged 16 hrs 300° F. |
| pH | 10.2 | 10.3 | 10.0 | 10.0 | 10.1 | 10.0 | 10.0 | 10.0 |
| Apparent Visc. (cps) | 65 | 68 | 17 | 23 | 14 | 21 | 28 | 23 |
| Plastic Visc. (cps) | 10 | 13 | 13 | 23 | 13 | 20 | 14 | 21 |
| Yield Point (lbs/100 ft$^2$) | 111 | 111 | 8 | 1 | 3 | 2 | 8 | 3 |
| Gel Strength (lbs/100 ft$^2$) | 39/39 | 45/53 | 15/30 | 3/56 | 3/30 | 4/63 | 20/59 | 4/82 |
| Fluid Loss, API (ml) | 72 | 77 | 53 | 21 | 37 | 16 | 37 | 16 |

*Dose level of 2.2 ppb adjusted to equal activity of other two additives.

Thus, the data in Tables IV and V demonstrate that the fluid loss property of the polymer compositions of this invention are superior to those of the homopolymer, sodium polyacrylate, alone while the rheology is comparable.

While the invention has been described with reference to certain specific embodiments thereof, it is understood that it is not to be limited since alterations and changes may be made therein which are within the full intended scope of the appended claims.

What is claimed is:

1. An aqueous clay containing drilling fluid having present in an amount sufficient to control the rheology of the drilling fluid and to reduce fluid loss of said drilling fluid, a water soluble polymer composition of (1) from about 75% to about 85% by weight of polyacrylic acid having a weight average molecular weight of between about 3,500 to about 4,500 and (2) from about 15% to about 25% by weight of the copolymer of itaconic acid and acrylamide having a weight average molecular weight of between about 20,000 to about 40,000, there being from about 40% to about 50% by weight of itaconic acid and from about 50% to about 60% by weight of acrylamide in said copolymer, said water soluble polymer composition having a weight average molecular weight of between about 5,000 to about 15,000 in its partially or completely neutralized salt form.

2. The drilling fluid of claim 1 wherein said drilling fluid is a mud selected from the group consisting of fresh water, seawater and calcium containing fresh water muds.

3. The drilling fluid of claim 2 wherein said polymer composition is present in an amount of from about 0.25 to about 11 pounds per 42 gallon barrel of drilling fluid.

4. The drilling fluid of claim 3 wherein said polymer composition is in the form of its partially or completely neutralized sodium, potassium or ammonium salt form.

5. The drilling fluid of claim 4 wherein said polymer composition contains about 80% by weight polyacrylic acid and about 20% by weight copolymer of itaconic acid and acrylamide, there being about 43% by weight itaconic acid and about 57% by weight acrylamide in said copolymer.

6. The drilling fluid of claim 5 wherein said polymer composition has a weight average molecular weight of 8,000±3,000.

7. In a method of drilling a well into a subterranean formation in which an aqueous clay containing drilling fluid is circulated into the well, the step of circulating said drilling fluid containing in an amount sufficient to control the rheology of the drilling fluid and to reduce fluid loss of said drilling fluid, a water soluble polymer composition of (1) from about 75% to about 85% by weight of polyacrylic acid having a weight average molecular weight of between about 3,500 to about 4,500 and (2) from about 15% to about 25% by weight of the copolymer of itaconic acid and acrylamide having a weight average molecular weight of between about 20,000 to about 40,000, there being from about 40% to about 50% by weight of itaconic acid and from about 50% to about 60% by weight of acrylamide in said copolymer, said water-soluble polymer composition having a weight average molecular weight of between about 5,000 to about 15,000 in its partially or completely neutralized salt form.

8. The method of claim 7 wherein said drilling fluid is a mud selected from the group consisting of fresh water, seawater and calcium containing fresh water muds.

9. The method of claim 8 wherein said polymer composition is present in an amount of from about 0.25 to about 11 pounds per 42 gallon barrel of drilling fluid.

10. The method of claim 9 wherein said polymer composition is in the form of its partially or completely neutralized sodium, potassium or ammonium salt form.

11. The method of claim 10 wherein the polymer composition contains about 80% by weight polyacrylic acid and about 20% by weight copolymer of itaconic acid and acrylamide, there being about 43% by weight itaconic acid and about 57% by weight acrylamide in said copolymer.

12. The method of claim 11 wherein said polymer composition has a weight average molecular weight of $8,000 \pm 3,000$.

* * * * *